(No Model.)
C. A. DIES.
VELOCIPEDE.
No. 450,997. Patented Apr. 21, 1891.
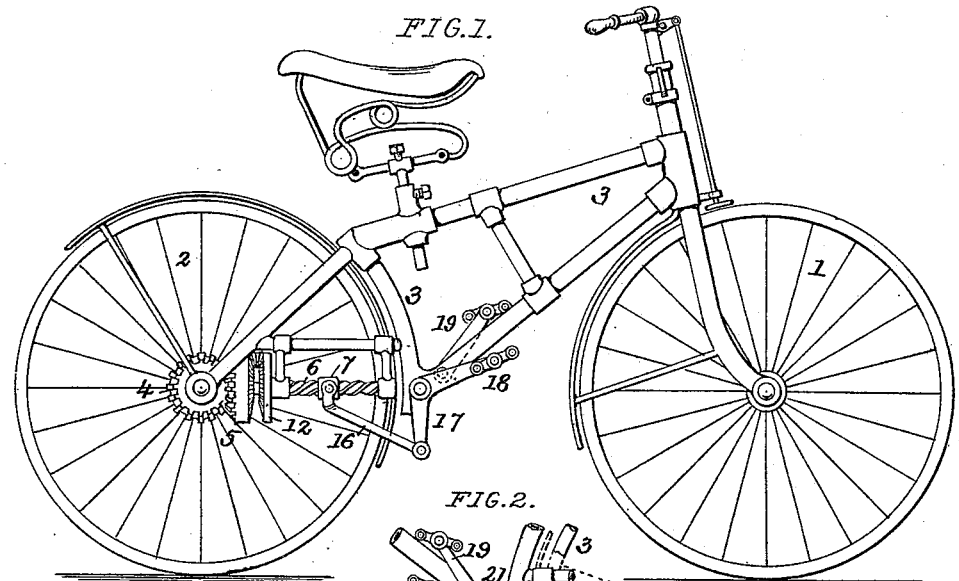
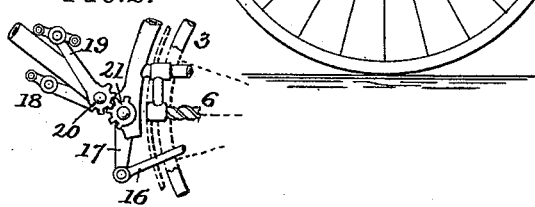
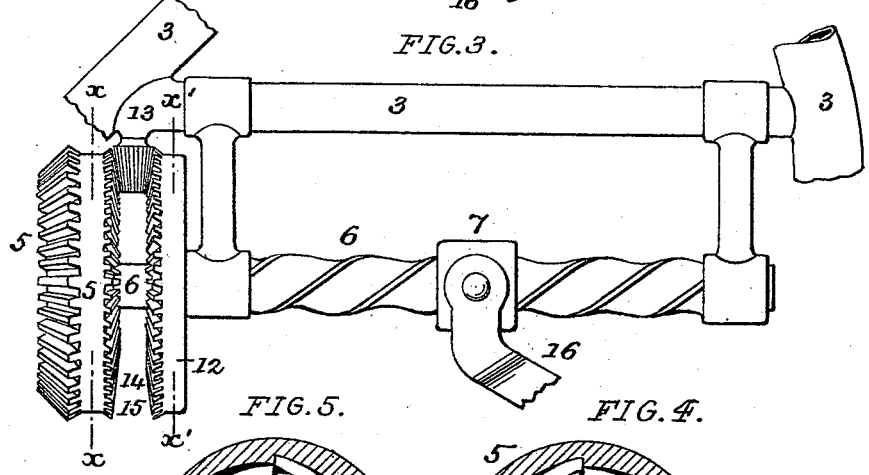
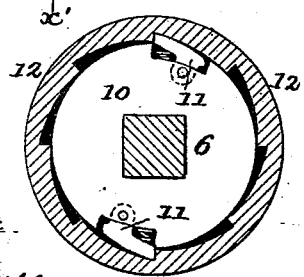
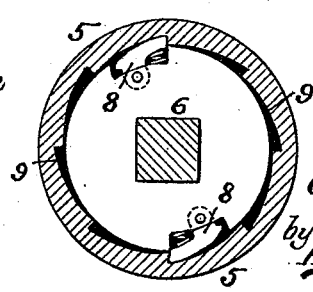
ATTEST:
Geo. H. Arthur
M. H. Holmes
INVENTOR:
Chas. A. Dies
by Robert Burns
Attorney.

UNITED STATES PATENT OFFICE.

CHARLES A. DIES, OF CHICAGO, ILLINOIS, ASSIGNOR OF ONE-HALF TO JOHN HART, OF SAME PLACE.

VELOCIPEDE.

SPECIFICATION forming part of Letters Patent No. 450,997, dated April 21, 1891.

Application filed October 7, 1890. Serial No. 367,351. (No model.)

*To all whom it may concern:*

Be it known that I, CHARLES A. DIES, a citizen of the United States, residing at Chicago, in the county of Cook and State of Illinois, have invented certain new and useful Improvements in Driving-Gear for Bicycles, &c.; and I do hereby declare the following to be a full, clear, and exact description of the invention, such as will enable others skilled in the art to which it appertains to make and use the same.

This invention relates to that type of bicycles or tricycles in which motion is communicated from the pedal or treadle shaft to that of the rear driving-wheels by suitable connections between the two shafts; and the present improvement has for its object to provide an improved connection between the pedal-shaft and that of the driving wheel or wheels, embodying the features of great durability and strength of parts and increased speed, combined with a minimum friction in the movement of the parts. I attain such object by the construction and arrangement of parts illustrated in the accompanying drawings, in which—

Figure 1 is a side elevation of a Safety bicycle embodying my present invention; Fig. 2, a detail side elevation of the opposite side of the treadle or pedal mechanism; Fig. 3, an enlarged detail side elevation of the motion-transmitting mechanism between the pedal or treadle mechanism and the shaft of the driving-wheels; Fig. 4, a transverse section at line *x x*, and Fig. 5 a similar view at line *x' x'*.

Similar letters of reference indicate like parts in the several views.

Referring to the drawings, 1 represents the front or guide wheel; 2, the rear or driving wheel, and 3 the connecting-frame in which the wheels 1 and 2 are journaled in the usual manner.

In the present invention the rear or driving wheel 2 is provided with a bevel-gear 4, that meshes with and is driven by a bevel-wheel 5 at the rear end of a forwardly-extending shaft 6, that is supported in suitable bearings on the main frame 3, as shown. The shaft 6 is formed with a quick-pitch screw thread or threads, upon which the correspondingly screw-threaded nut 7 travels, and in its rectilinear reciprocating movement imparts a rotary reciprocating motion to the shaft 6, which in turn imparts a continuous rotary motion to the bevel-wheels 4 and 5 through the following mechanism: The bevel-wheel 5 is loose on the shaft 6, and is locked thereto in one direction by the spring-dogs 8 in a hub fixed on said shaft, engaging in the internal ratchet 9, formed in the hollow hub of said bevel-gear 5, as illustrated in Fig. 4. The reverse movement of the shaft 6 is converted into a continuous rotary movement of the bevel-wheels in the one direction through the instrumentality of a ratchet-hub 10 on said shaft, carrying spring-dogs 11, that engage the internal ratchet formed in the sleeve 12, which sleeve is geared to the bevel-wheel 5 by a bevel-pinion 13, meshing with the bevel-teeth formations 14 and 15 on the bevel-wheel 5 and the sleeve 12, respectively. With this improved construction of parts the rotary reciprocating movement of the screw-shaft 6 will be converted into a continuous rotary movement of the bevel-gears 5 and 4.

Motion is communicated to the reciprocating nut 7 by a forked link 16, that extends forward to an arm 17 on the shaft of the foot-levers, so as to vibrate or rock with the same. The said levers are of the treadle or rocking type, the right-hand lever 18 and arm 17 being preferably formed in one piece, as shown in Fig. 1, while the left-hand lever 19 is pivoted a short distance away from the shaft of the right-hand lever, and is geared thereto by the sectors 20 and 21, the purpose being to admit of one foot-lever rising while the other is descending, and vice versa.

In use the ratchet mechanism may be modified and arranged in different relations, as will readily suggest themselves to those skilled in the art, and likewise the arrangement and location of the motion-producing screw-shaft may be modified to suit tricycle and like uses without departing from the spirit of my invention.

Having thus fully described my said invention, what I claim as new, and desire to secure by Letters Patent, is—

1. The combination, with the operating treadle or lever and driving-wheel of a bicycle, &c., of the quick-pitch screw-shaft 6, reciprocating nut 7 for the same, having operative connection to the foot-lever, and duplicate ratchet mechanism, substantially as herein set forth, for imparting a continuous rotary motion to the bevel-wheel 5, essentially as set forth.

2. The combination, with the operating treadle or lever and driving-wheel of a bicycle, &c., of the quick-pitch screw-shaft 6, reciprocating nut 7 for the same, having a link connection 16 to the arm 17 of the foot-lever, reversed ratchet mechanism 8 9 and 10 11 12, bevel-pinion 13, bevel formations 14 and 15, and bevel-gears 4 and 5, essentially as set forth.

3. The combination, with the operating treadle or lever and driving-wheel of a bicycle, &c., of the quick-pitch screw-shaft 6, reciprocating nut 7 for the same, having operative connection to the foot-lever, duplicate ratchet mechanism, substantially as herein set forth, for imparting a continuous rotary motion to the bevel-wheel 5, and the foot-levers 18 and 19, the lever 19 being geared to the shaft of the lever 18 by gears 20 and 21, essentially as set forth.

In testimony whereof I affix my signature in presence of two witnesses.

CHARLES A. DIES.

Witnesses:
ROBERT BURNS,
GEO. H. ARTHUR.